United States Patent [19]

Scola et al.

[11] Patent Number: 5,104,474
[45] Date of Patent: Apr. 14, 1992

[54] METHOD FOR MAKING A FIBER REINFORCED CROSSLINKED POLYIMIDE MATRIX COMPOSITE ARTICLE

[75] Inventors: Daniel A. Scola, Glastonbury; John H. Vontell, Manchester, both of Conn.

[73] Assignee: United Technologies Corporation, Hartford, Conn.

[21] Appl. No.: 564,663

[22] Filed: Aug. 8, 1990

Related U.S. Application Data

[63] Continuation of Ser. No. 278,525, Dec. 1, 1988, abandoned.

[51] Int. Cl.$^5$ .................. B32B 31/00; C09J 5/02; C09J 5/06
[52] U.S. Cl. .................. 156/286; 156/307.1; 156/312; 156/322; 156/331.3
[58] Field of Search .................. 156/286, 307.1, 312, 156/322, 331.3, 332, 285; 528/353; 428/473.5; 427/374.6; 264/137, 258, 257, 347, 571

[56] References Cited

U.S. PATENT DOCUMENTS

| | | | |
|---|---|---|---|
| 2,683,105 | 7/1954 | Forbes et al. | 156/312 |
| 3,563,951 | 2/1971 | Radlmann | 528/353 |
| 3,697,308 | 10/1972 | Lubowitz | 156/307.5 |
| 3,697,345 | 10/1972 | Vaughan | 156/331.3 |
| 4,065,340 | 12/1977 | Dickerson | 156/286 |
| 4,197,339 | 4/1980 | Paul et al. | 528/353 |
| 4,357,193 | 11/1982 | McGann et al. | 156/286 |
| 4,485,140 | 11/1984 | Gannett et al. | 528/353 |
| 4,681,718 | 7/1987 | Oldham | 264/102 |
| 4,765,942 | 8/1988 | Christensen et al. | 264/258 |
| 4,846,908 | 7/1989 | Aldrich et al. | 156/312 |
| 4,944,824 | 7/1990 | Gupta | 156/286 |

FOREIGN PATENT DOCUMENTS

WO80/02528 11/1980 PCT Int'l Appl. .................. 156/286

OTHER PUBLICATIONS

Encyclopedia of Polymer Science and Engineering, vol. 7, 1987, pp. 649–651.
Guttmann, Concise Guide to Structural Adhesives, 1961, pp. 36–38.

Primary Examiner—Caleb Weston
Assistant Examiner—Steven D. Maki
Attorney, Agent, or Firm—Kevin E. McVeigh; James M. Rashid

[57] ABSTRACT

A method for making a fiber reinforced crosslinked polyimide matrix composite article that is substantially free of internal voids and surface blisters is disclosed. The method includes heating a fiber prepreg under vacuum to remove volatile impurities and volatile reaction products from the prepreg and subsequently curing the prepreg to form the article.

13 Claims, 1 Drawing Sheet

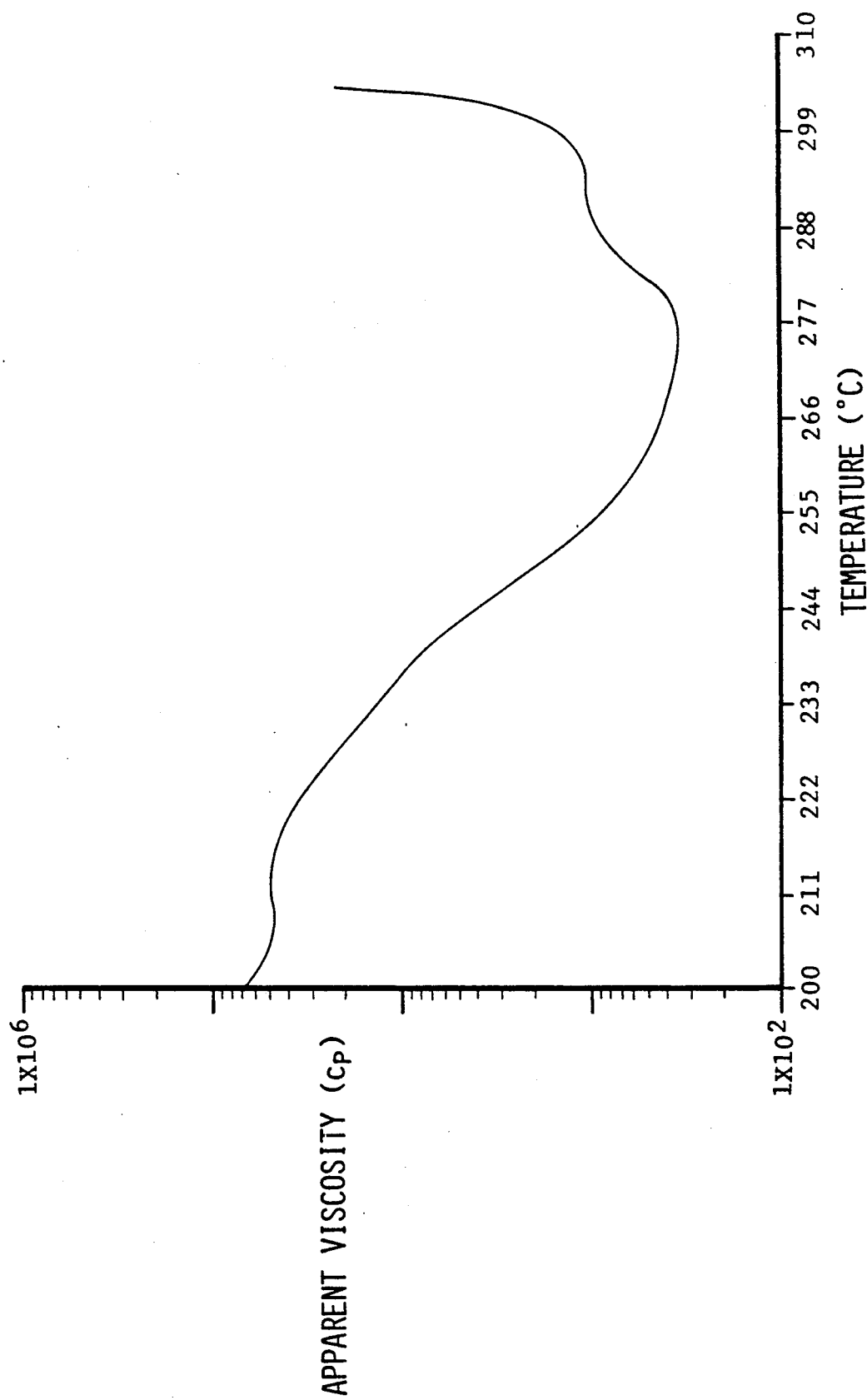

METHOD FOR MAKING A FIBER REINFORCED CROSSLINKED POLYIMIDE MATRIX COMPOSITE ARTICLE

This is a continuation of application Ser. No. 07/278,525 filed Dec. 1, 1988, now abandoned.

TECHNICAL FIELD

This invention pertains to thermosetting polyimide resins.

BACKGROUND ART

The excellent high temperature mechanical properties of polyimide resins have led to their increased use in high performance applications, particularly in the field of fiber reinforced resin matrix composite materials.

Both thermoplastic and thermosetting polyimide resins are available commercially. The thermosetting resins are the more widely used, despite significant processing difficulties associated with thermosetting resins. A method of processing thermosetting polyimide resins known as the Polymerization of Monomeric Reactants (PMR) employs an easily evaporated solvent, e.g. methanol, to dissolve monomeric polyimide precursors and form a low viscosity solution for fiber impregnation. Typically, reinforcing fibers are impregnated with a solution of monomeric reactants, the solvent is evaporated and the reactants are cured by heating the impregnated fibers under pressure in an autoclave or in a compression mold to form a fiber reinforced polyimide matrix article. In both processes, volatile components, i.e. solvents, impurities and reaction products may become trapped within the resin during cure and cause internal voids and surface blisters.

What is needed in the art is a method for making a crosslinked polyimide that is substantially free of internal voids and surface blisters.

DISCLOSURE OF INVENTION

A method for pretreating a prepreg to form an imidized prepreg is disclosed. The imidized prepreg so formed is substantially free of volatile impurities and volatile reaction products. The method comprises heating a prepreg, said prepreg comprising reinforcing fiber and a reaction mixture and said reaction mixture initially comprising an aromatic diamine, an end cap monomer and an aromatic dianhydride, a diester-diacid of an aromatic dianhydride or a tetracid of an aromatic dianhydride, to a sufficient temperature for a sufficient period of time so that the reaction mixture forms a low viscosity substantially noncrosslinked molten imidized intermediate, and subjecting the prepreg to subatmospheric pressure during the heating so that volatile impurities and volatile reaction products are removed from the prepreg.

A further aspect of the disclosure includes methods for making a fiber reinforced crosslinked polyimide resin matrix composite article, wherein the article is substantially free of internal voids and surface blisters.

A first method for making the article comprises heating a plurality of plies of prepreg according to the above method to form plies of imidized prepreg, stacking the plies of imidized prepreg to form a laminated imidized prepreg and curing the laminated imidized prepreg to form the article.

A second method for making the article comprises stacking a plurality of plies of prepreg to form a laminated prepreg, heating the laminated prepreg according to the method described above to form a laminated imidized prepreg and curing the laminated imidized prepreg to form the article.

The forgoing and other features and advantages of the present invention will become more apparent from the following description and accompanying drawings.

BRIEF DESCRIPTION OF THE DRAWING

The Figure shows the relationship between apparent viscosity and temperature for PMR15.

BEST MODE FOR CARRYING OUT THE INVENTION

The present invention is a process for pretreating a fiber prepreg to form an imidized prepreg. A prepreg comprises reinforcing fibers impregnated with a reaction mixture.

The reaction mixture of the process of the present invention initially comprises a mixture of monomeric reactants. Suitable mixtures of monomeric reactants are those which react upon heating to form a fusible oligomeric imide intermediate wherein the intermediate may be cross linked by further heating to form a thermosetting polyimide resin.

PMR resins exemplify such reaction mixtures. PMR resins initially comprise a mixture of 4,4', methylenedianiline (MDA), the dimethylester of 3,3',4,4' benzophenonetetracarboxylic acid (BTDE) and the monomethylester of 5-norbornene 2,3 dicarboxylic acid (NE).

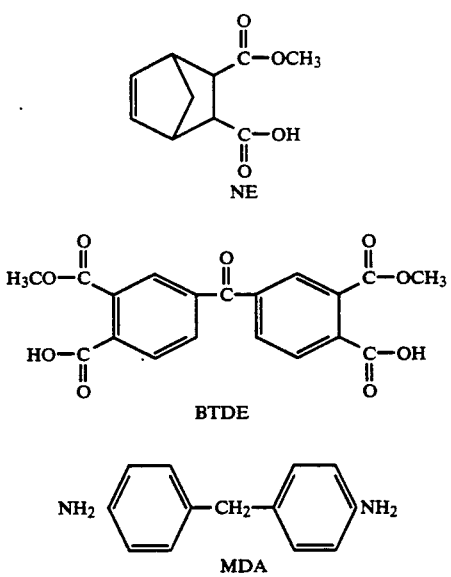

A mixture of MDA, BTDE and NE in a molar ratio of 2 moles NE/n+1 moles MDA/n moles BTDE reacts upon heating to form an imidized oligomer having a theoretical structure:

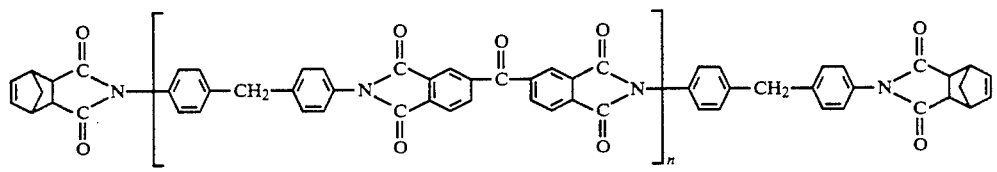

The number of repeating units, n, may be varied to form a homologous series of PMR resins wherein each resin of the series in characterized by the theoretical average molecular weight of the imidized oligomer intermediate. The monomeric molar ratio, and the average molecular weight of the imidized oligomer for a series of homologous PMR resins are given in Table 1.

TABLE 1

| Molar Ratio NE/MDA/BTDE | Average MW of Oligomer | Resin Designation |
|---|---|---|
| 2/2.00/1.00 | 974.806 | PMR-9.75 |
| 2/2.052/1.052 | 1000 | PMR-10 |
| 2/2.258/1.258 | 1100 | PMR-11 |
| 2/2.671/1.67 | 1300 | PMR-13 |
| 2/3.087/2.087 | 1500 | PMR-15 |
| 2/3.497/2.497 | 1700 | PMR-17 |
| 2/4.117/3.117 | 2000 | PMR-20 |

PMR-15 is the most widely used of the PMR resins and a PMR-15 reaction mixture comprising a molar ratio of 2 NE/3.087 MDA/2.087 BTDE is the most preferred reaction mixture for the practice of the process of the present invention.

Analogous compounds may be formulated by substituting an aromatic dianhydride, a tetracid of an aromatic dianhydride or a diester-diacid of an aromatic dianhydride for the BTDE. For example, the dimethylester of 4,4', hexafluoroisopropylidene bis(phthalic acid) (HFDE) is substituted for BTDE in an analogous series polyimides commonly known as a PMR-II resins.

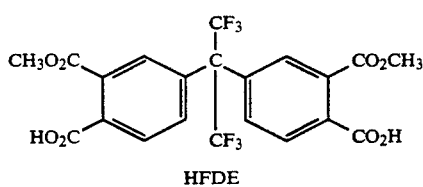

HFDE

Analogous compounds may be formulated by substituting a different aromatic diamines or an aromatic polyamines for the MDA. For example, Jeffamine AP22 (Texaco) may be substituted for MDA to give an analogous polyimide resin commonly known as LARC-160.

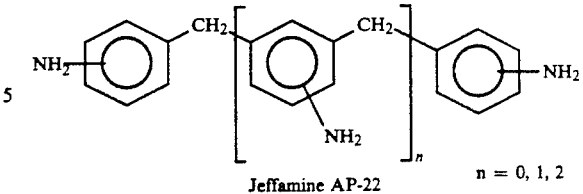

Jeffamine AP-22     n = 0, 1, 2

Similarly, paraphenylene diamine (PPDA) is substituted for MDA in PMR-II resins.

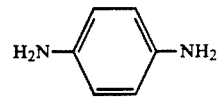

PPDA

A mixture of PPDA, HFDE and NE in a molar ratio of 2 moles NE/n+1 moles PPDA/n moles HFDE reacts upon heating to form an imidized oligomer having the theoretical structure:

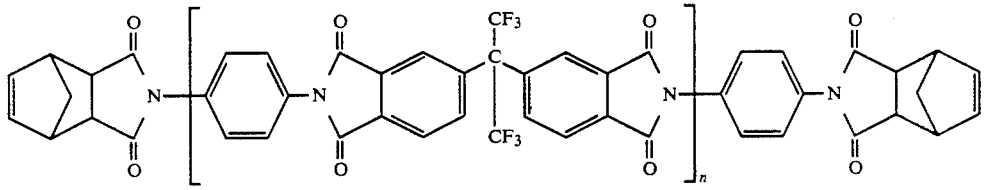

PMR-II Oligomer

The monomeric molar ratio, and the average molecular weight of the imidized oligomer for a series of homologous PMR-II resins are given in Table 2.

TABLE 2

| Molar Ratio NE/HFDE/PPDA | Average MWP Oligomer | Resin Designation |
|---|---|---|
| 2/2.161/1.161 | 1000 | PMR-II 10 |
| 2/2.684/1.684 | 1270 | PMR-II 12.7 |
| 2/2.742/1.742 | 1300 | PMR-II 13 |
| 2/3.129/2.129 | 1500 | PMR-II 15 |
| 2/4.097/3.097 | 2000 | PMR-II 20 |
| 2/5.996/4.996 | 2980 | PMR-II 29.8 |
| 2/6.034/5.034 | 3000 | PMR-II 30 |
| 2/9.908/8.903 | 5000 | PMR-II 50 |
| 2/10.005/9.00 | 5050 | PMR-II 50.5 |

Analogous for compounds may be formulated by substituting other end cap monomers for the NE. Examples of other suitable end cap monomers include the monomethylester of itaconic acid (ITE), the monomethylester of 2,5-bicyclo (2.2.1)heptadiene-2,3-dicarboxylic acid (NDE) and the monomethylester of maleic acid (MAE).

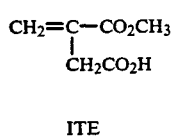 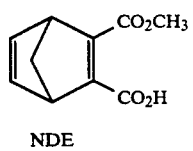 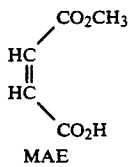

ITE  NDE  MAE

Processing aids may also be included in the reaction mixture. For example, N-phenylnadimide has been found to be useful as a reactive viscosity modifier to lower the melt viscosity.

The fiber reinforcement in the process of the present invention may comprise graphite fibers, carbon fibers, glass fibers, refractory ceramic fibers or silicon carbide fibers. Graphite fibers are preferred for applications in which high modulus fibers are required. Glass fibers are preferred in applications in which lower modulus fibers are acceptable. Woven fiber cloth, unidirectional fiber tapes or fiber rovings are impregnated with the solution of reaction mixture and the solvent is evaporated to form the "prepreg". Composite articles made by the process of the present invention typically include between about 30 volume percent and about 60 volume percent fiber reinforcement.

Single plies of prepreg may be pretreated according to the process of the present invention to form single plies of imidized prepreg and the plies of imidized prepreg may be laid up to form a laminated imidized prepreg. Alternatively, prepreg plies may be laid up to form a laminated prepreg and the laminated prepreg may be pretreated according to the present invention to form a laminated imidized prepreg. In either case, the laminated imidized prepreg of the present invention may be cured by conventional autoclave or compression molding techniques to form a fiber reinforced crosslinked polyimide matrix composite article that is substantially free of internal voids and surface blisters.

Heating the prepreg produces time dependent rheological and chemical changes in the reaction mixture. The parameters of the process of the present invention are determined from the relationships between apparent viscosity of the reaction mixture, temperature, and time.

The Figure shows the relationship between the apparent viscosity of a PMR-15 reaction mixture and temperature as the mixture was heated from 200° C. at a rate of 5° C./minute. The apparent viscosity of the PMR-15 reaction mixture decreases as the mixture was heated from 200° C. to about 275° C. The viscosity decrease appears to be due to softening and melting of the fusible imidized intermediate. The viscosity of the reaction mixture increases as the mixture is further heated from about 275° C. to about 303° C. At temperatures of about 300° C. the viscosity of the reaction mixture increases very rapidly. The increase in viscosity appears to be due to crosslinking of the oligomeric intermediate and gelation of the reaction mixture to form a crosslinked polyimide resin.

The viscosity of the reaction mixture decreases while the rate at which the crosslinked polyimide is formed increases with increasing temperature. Defining the critical temperature range for processing the prepreg according to the present invention involves balancing the decrease in the viscosity of the reaction mixture and the increase in the rate at which the oligomer reacts to form the crosslinked polyimide. At temperatures below about 245° C., the viscosity of the reaction mixture is too high to permit removal of volatile components within a reasonable processing time, at temperatures above about 265° C. the crosslinking reaction is too rapid to permit removal of volatile components and still provide a substantially noncrosslinked prepreg. Heating prepreg plies of PMR reaction mixture impregnated fibers to a temperature between about 245° C. and about 265° C. for a time period between about 30 minutes and about 70 minutes has been found to be sufficient to form a low viscosity substantially noncrosslinked molten imide oligomer from which volatile components may be removed within a reasonable processing time. It is believed that very similar results would be obtained using the analogous reaction mixtures discussed above.

The prepreg is maintained at a temperature within the critical temperature range under subatmospheric pressure so that volatile impurities and volatile reaction products are removed from the prepreg during the heating process. It is preferred that the subatmospheric pressure correspond to a vacuum of greater than about 200 mm of mercury and particularly preferred that the subatmospheric pressure corresponds to a vacuum of between 500 mm of mercury and 600 mm of mercury.

The prepreg is subsequently cooled to produce a molding material, i.e. a partially cured material analogous to a conventional "B-stage" fiber prepreg material, which may be fully cured by further heating. Unlike conventional B-stage materials, the pretreated prepreg of the present invention is substantially free of volatile impurities and reaction products.

As noted above, laminated imidized fiber prepreg of the present invention may be consolidated and cured according to convention vacuum bag or compression molding procedures to form a composite article. For example, a laminated imidized fiber prepreg of the present invention may be consolidated and cured by heating the prepreg to an elevated temperature between about 290° C. and about 320° C. under superatmospheric pressure maintained under superatmospheric pressure at the elevated temperature for a time period between about 1 hour and 2 hours to form the fiber reinforced crosslinked polyimide matrix composite article. It is preferred that a superatmospheric pressure of between about 100 psi and about 2000 psi be applied to the prepreg during the heating.

Finally, the fiber reinforced crosslinked polyimide matrix composite article so formed may be subjected to a conventional post cure, e.g. by maintaining the article at a temperature between about 290° C. and about 320° C. for a time period of between about 18 hours and about 24 hours.

The fiber reinforced polyimide matrix article formed by the process of the present invention is substantially free of internal voids and surface blisters.

While the process of the present invention is described primarily in terms of fiber reinforced polyimide matrix composite articles, it may be readily appreciated that the process provides similar advantages to particulate reinforced polyimide matrix articles and to nonreinforced polyimide articles.

EXAMPLE

Celion 6000 reinforced PMR-15 matrix composite samples were laid up and cured by several different processes.

In an exemplary prior art process (process A) prepreg laminates were laid up, pretreated at 200° C. in air under ambient pressure for one hour and then compression molded under 1,000 psi pressure during heating to a temperature of 316° C. and held for one hour at 316° C. and 1,000 psi. During the temperature increase, the pressure was released periodically up to 270° C. to allow volatile materials to escape from the mold.

In process B prepreg laminates were laid up and pretreated at 200° C. under vacuum for 30 minutes in an autoclave. The vacuum was released, pressure (200 psi) was applied and the temperature was increased to 316° C. for 1 hour to cure the laminate.

In process C prepreg laminates were pretreated at 250° C. in air at ambient pressure for 1 hour. The pretreated prepreg laminates were cured by compression molding at 316° C. and 1000 psi for 1 hour.

In an exemplary process of the present invention (process D) prepreg laminates were pretreated at 250° C. under vacuum for 1 hour. The pretreated prepreg laminates were cured by compression molding at 316° C. and 1000 psi for 1 hour.

In an exemplary process of the present invention (process E) prepreg laminates were pretreated at 260° C. under vacuum for 1 hour. The pretreated prepreg laminates were cured by compression molding at 316° C. and 1000 psi for 1 hour.

Composite samples made by each of the above described processes were subjected to interlaminar shear testing and flexural testing. The interlaminar sheer strength at room temperature and at 316° C. is given in Table I for each group of samples. The flexural strength and flexural modulus at room temperature and at 316° C. are given in Table II for each group of samples.

Composite samples made by each of the above methods were subjected to a post cure. Samples at room temperature were introduced to a 316° C. oven and post cured at 316° C. for 16 hours. Post cured samples were inspected for surface blisters. Results of the inspection are given in Table I.

strength at room temperature and higher flexural strength at 600° F. The samples prepared by process B exhibited surface blisters.

The samples prepared by process C exhibited properties comparable to the samples produced by process B, but exhibited no surface blisters.

The samples produced by process D exhibited higher shear strength, higher flexural strength and higher flexural modulus than the samples produced by process A, at both room temperature and 600° F. and did not exhibit surface blisters.

The process of the present invention allows the fabrication of fiber reinforced crosslinked polyimide matrix composite article which are substantially free of internal voids and surface blisters.

Although this invention has been shown and described with respect to detailed embodiments thereof, it will be understood by those skilled in the art that various changes in form and detail thereof may be made without departing from the spirit and scope of the claimed invention.

We claim:

1. A method for making a reinforced crosslinked polyimide resin matrix composite article, comprising:
heating a plurality of plies of prepreg, said plies of prepreg each comprising reinforcing fibers and a reaction mixture, said reaction mixture initially comprising an aromatic diamine, an end cap monomer and at least one of an aromatic dianhydride, a diester-diacid of an aromatic dianhydride or a tetracid of an aromatic dianhydride, to a temperature between 245° and 265° C. and holding at said temperature for a period of time between 30 and 70 minutes so that the reaction mixture forms a low viscosity substantially noncrosslinked molten imide intermediate, wherein said heating step includes subjecting the heated plies of prepreg to subatmo-

TABLE I

Interlaminar Shear Properties of Celion 6000/PMR-15 Composites

| Prepreg Pretreatment | Molding Method | Interlaminar Shear Strength, ksi | | Post Cure Blister Formation |
|---|---|---|---|---|
| | | RT | 316° C. (600° F.) | |
| A (200° C./1 hr/air) | Compression | 15.0 | 5.89 | Yes |
| B (200° C./0.5 hr/vacuum) | Autoclave | 15.9 | 7.94 | Yes |
| C (250° C./1 hr/air) | Compression | 11.8 | 6.23 | No |
| D (250° C./1 hr, vacuum) | Compression | 17.0 | 7.43 | No |
| E (260° C./1 hr, vacuum) | Compression | 16.3 | 7.19 | No |

TABLE II

Flexural Properties of Celion 6000/PMR-15 Composites

| Prepreg Pretreatment | Molding Method | Flexural Properties | | | |
|---|---|---|---|---|---|
| | | Strength, ksi | | Modulus 10 psi | |
| | | RT | 316° C. (600° F.) | RT | 316° C. (600° F.) |
| A (200° C./1 hr/air) | Compression | 238 | 105 | 17.1 | 15.7 |
| B (200° C./0.5 hr, vacuum) | Autoclave | 233 | 114 | 17.3 | 16.9 |
| C (250° C./1 hr/air) | Compression | 238 | 103 | 18.7 | 16.4 |
| D (250° C./1 hr, vacuum) | Compression | 264 | 133 | 18.2 | 17.4 |
| E (260° C./1 hr, vacuum) | Compression | 245 | 127 | 18.2 | 17.8 |

The properties exhibited by the samples prepared by prior art process A provide a basis for comparing the improved properties exhibited by samples prepared by the method of the present invention. The samples prepared by process A exhibited surface blisters.

Compared to the samples prepared by process A, the samples prepared by process B exhibited higher shear strength and higher flexural modulus at both room temperature and 600° F. and exhibited comparable flexural spheric pressure between 500 and 600 mm Hg to remove volatile impurities and volatile reaction-products from the plies of prepreg and form plies of imidized prepreg, stacking plies of imidized prepreg under superatmospheric pressure to a temperature and for a period of time sufficient to form the fiber reinforced crosslinked polyimide matrix composite article by consolidating he plies and crosslinking the imide intermediate, wherein the article so formed is substantially free of internal voids and surface blisters.

2. The method of claim 1, wherein the reaction mixture initially comprises the dimethylester of 3,3', 4,4' benzophenonetetracarboxylic acid, 4,4' methylenedianiline, and the monomethylester of 5-norbornene-2,3-dicarboxylic acid.

3. The method of claim 1, wherein the reaction mixture initially comprises the dimethylester of 4,4' hexafluoroisopropylidene bis(phthalic acid), paraphenylene diamine and the monomethyl ester of 5-norbornene 2,3 dicarboxylic acid.

4. The process of claim 1, wherein the step for heating the laminated imidized prepreg is conducted at a temperature between about 290° C. and about 320° C. for a period between about 1 hour and about 2 hours.

5. The process of claim 1 additionally comprising heating the fiber reinforced crosslinked polyimide matrix composite article to a temperature between about 290° C. and about 320° C. for a time period between about 8 hours and about 24 hours to form a post cured fiber reinforced crosslinked polyimide matrix composite article, wherein the post cured fiber reinforced crosslinked polyimide matrix composite article so formed is substantially free of internal voids and surface blisters.

6. A method for making a reinforced crosslinked polyimide resin matrix composite article, comprising:

stacking a plurality of plies of prepreg, said plies of prepreg each comprising reinforcing fibers and a reaction mixture, said reaction mixture initially comprising an aromatic diamine, an end cap monomer and at least one of an aromatic dianhydride, a diester-diacid of an aromatic dianhydride or a tetracid of an aromatic dianhydride, to form a laminated prepreg, heating the laminated prepreg to a temperature between 245° and 265° C. and holding at said temperature for a period of time between 30 and 70 minutes so that the reaction mixture forms a low viscosity substantially noncrosslinked molten imidized intermediate, wherein said heating step includes subjecting the laminated prepreg to subatmospheric pressure between 500 and 600 mm Hg to remove volatile impurities and volatile reaction products from the laminated prepreg and form a laminated imidized prepreg, and heating the laminated imidized prepreg under superatmospheric pressure to a temperature and for a period of time sufficient to form the fiber reinforced crosslinked polyimide matrix composite article by consolidating the plies and crosslinking the imide intermediate, wherein he article so formed is substantially free of internal voids and surface blisters.

7. The method of claim 6, wherein the reaction mixture initially comprises the dimethylester of 3,3', 4,4' benzophenonetetracarboxylic acid, 4,4' methylenedianiline and the monomethylester of 5-norbornene 2,3-dicarboxylic acid.

8. The method of claim 6, wherein, the reaction mixture initially comprises the dimethylester of 4,4' hexafluoroisopropylidene bis(phthalic acid), paraphenylene diamine and the monomethyl ester of 5-norbornene 2,3 dicarboxylic acid.

9. The process of claim 6, where the step for heating the laminated imidized prepreg is conducted at a temperature between about 290° C. and about 320° C. for a time period between about 1 hour and about 2 hours.

10. The process of claim 6 additionally comprising heating the fiber reinforced crosslinked polyimide matrix composite article to a temperature between about 290° C. and about 320° C. for a time period between about 8 hours and about 24 hours to form a post cured fiber reinforced crosslinked polyimide matrix composite article, wherein the post cured fiber reinforced crosslinked polyimide matrix composite article so formed is substantially free of internal voids and surface blisters.

11. The method of claim 1, further comprising cooling the imidized prepreg.

12. The method of claim 6, wherein the step for heating the laminated prepreg is conducted at a temperature of 250° C. for a time period of 1 hour.

13. The method of claim 6, wherein the step for heating the laminated prepreg is conducted at a temperature of 260° C. for a time of 1 hour.

* * * * *